United States Patent [19]
Sieren et al.

[11] 3,741,356
[45] June 26, 1973

[54] CONTROL LINKAGE FOR MASTER AND TRANSMISSION CLUTCHES

[75] Inventors: Gerald E. Sieren, Greendale; Kenneth N. Hansen, Waukesha, both of Wis.

[73] Assignee: Allis-Chalmers Corporation, Milwaukee, Wis.

[22] Filed: Dec. 13, 1971

[21] Appl. No.: 207,434

[52] U.S. Cl. ............. 192/3.61, 192/48.7, 192/99 S, 192/114, 74/474
[51] Int. Cl. ........................................... B60k 29/00
[58] Field of Search ................. 192/3.54, 3.61, 48.1, 192/48.3, 99 S, 48.7

[56] References Cited
UNITED STATES PATENTS
2,201,192  5/1940  Maybach ....................... 192/3.61 X
1,499,418  7/1924  Stevens .......................... 192/99 S X
1,746,765  2/1930  Carhart ............................. 192/48.7
2,367,076  1/1945  Varblow ....................... 192/99 S X
2,991,862  7/1961  Glesmann ......................... 192/48.7

FOREIGN PATENTS OR APPLICATIONS
677,753  8/1952  Great Britain ..................... 192/3.54

Primary Examiner—Benjamin W. Wyche
Attorney—Arthur L. Nelson et al.

[57] ABSTRACT

A vehicle brake and transmission control having a hand latch to selectively disengage one or two clutches while engaging the brake with a foot control lever.

10 Claims, 9 Drawing Figures

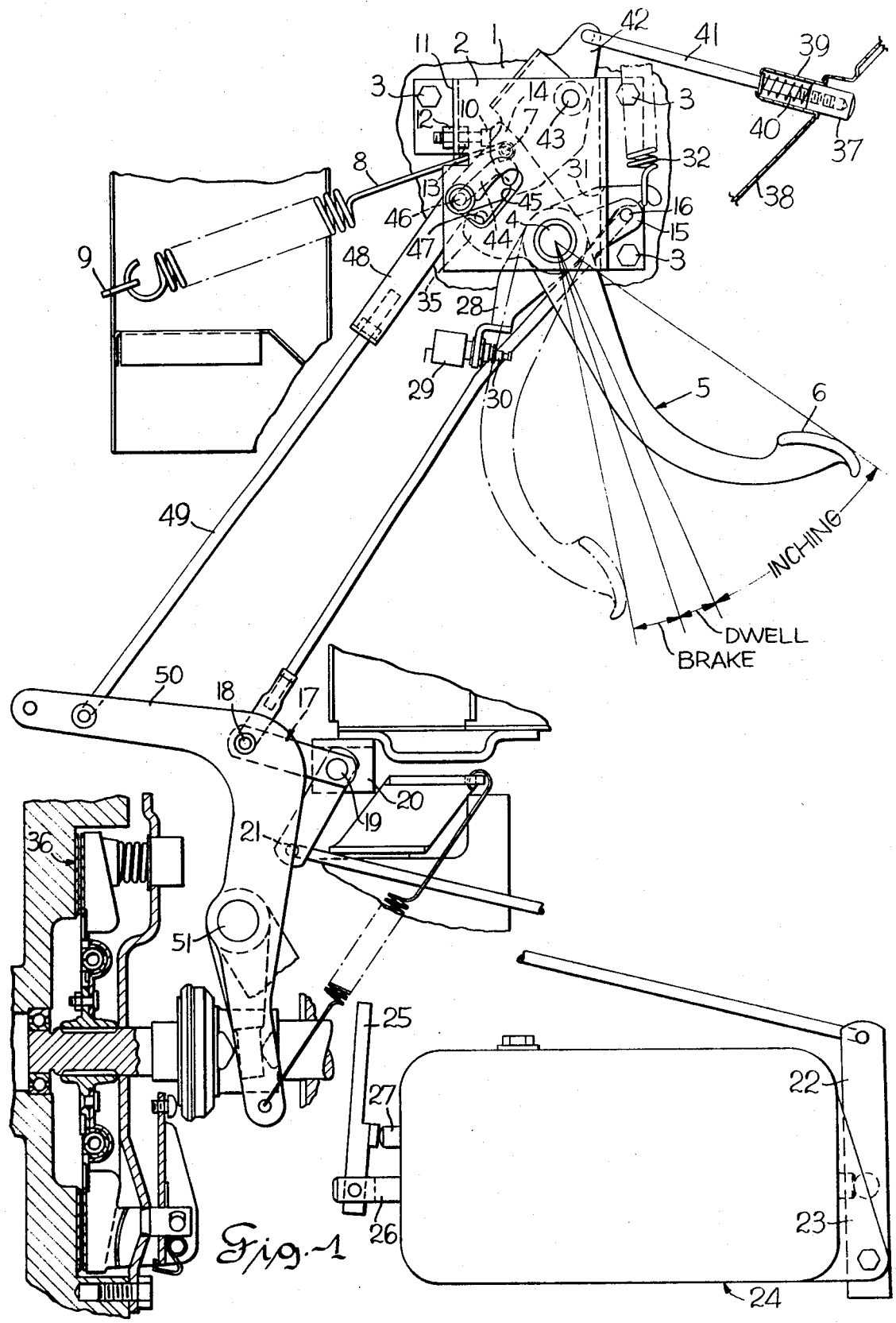

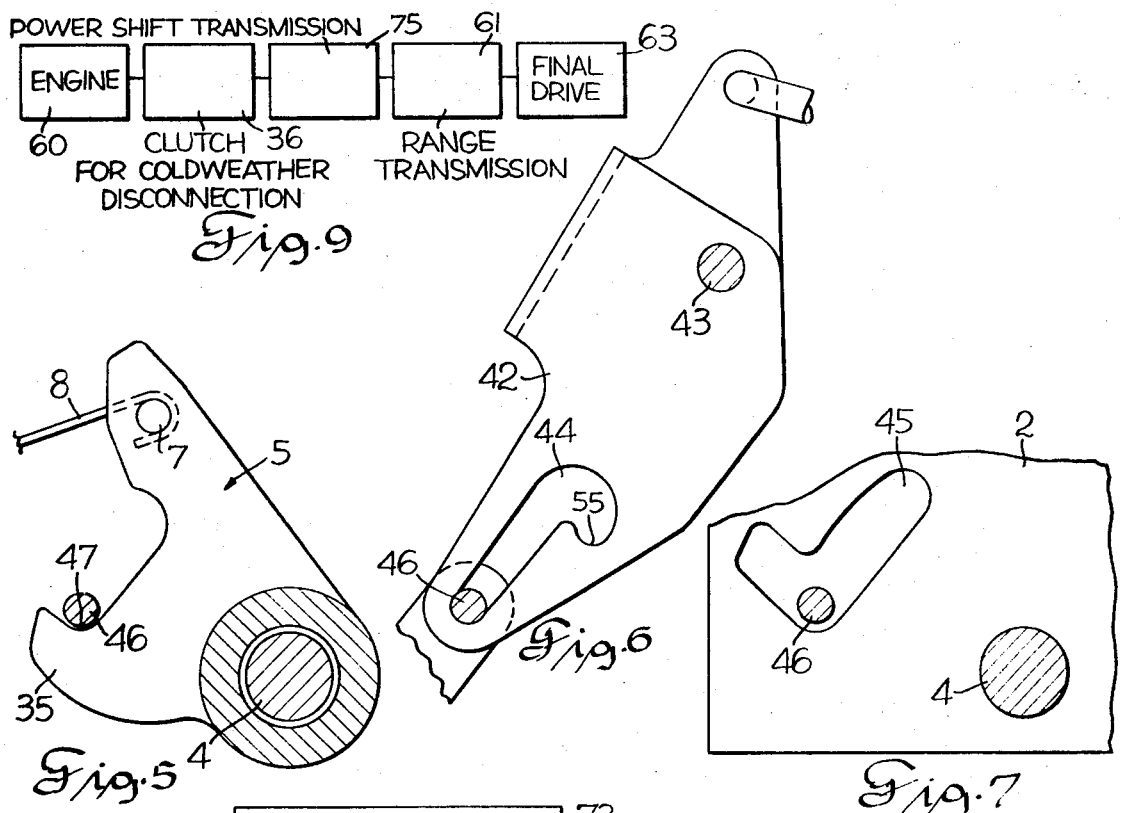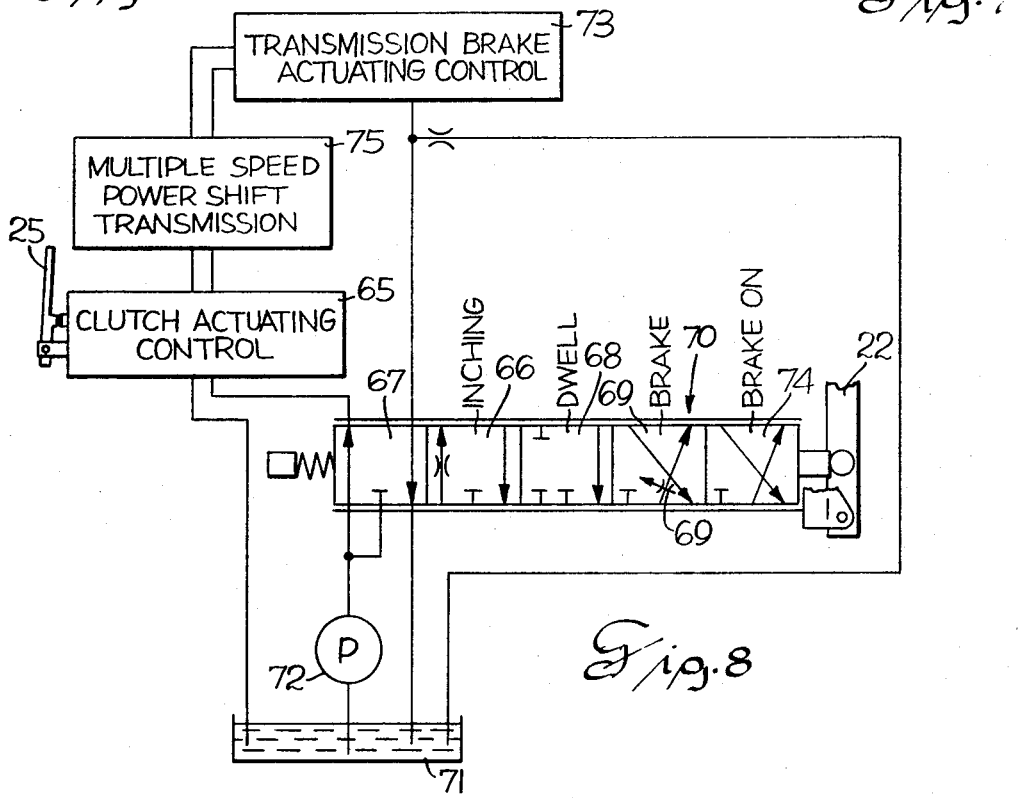

CONTROL LINKAGE FOR MASTER AND TRANSMISSION CLUTCHES

This invention relates to a clutch and brake control and more particularly to a foot operated clutch and brake control with a hand operated latch control selectively controlling engagement and disengagement of one of two clutches.

The conventional tractor using a multiple speed transmission with a manually controlled clutch for engaging and disengaging gears is usually provided with a manual control for selecting the desired gear ratio. Shifting from one gear ratio to another essentially requires disengagement of the clutch and manually shifting into another gear ratio and then engaging the clutch to transmit power through the gear train. This type of a transmission has a manually controlled clutch which must be disengaged before the engine is started. To prevent starting with the transmission in gear, the neutral safety switch is normally open when the clutch is engaged. When the clutch is disengaged, the clutch level actuates the starter safety switch completing the electrical circuit for starting of the tractor. Accordingly, the tractor cannot be started unless the transmission clutch is disengaged.

With the use of a power shift transmission, the power train becomes somewhat more complex. The engine drives through the power shift transmission. In a more sophisticated arrangement a clutch is positioned between the engine and the power shift transmission. This clutch provides a means for disconnecting the power train during cold weather to permit turning over of the engine more readily than if the engine were driving the power shift transmission. With a power shift transmission, a two-speed range transmission may also be used which will multiply the speed ratios of the power train. The range transmission can be positioned ahead of the power shift transmission or behind the power shift transmission as desired. The range transmission, whether two or three speeds provides a multiple of the number of speeds in the power shift transmission for the power train. The final drive assembly of course transmits the power from the transmissions to the final drive for driving the drive wheels of the vehicle. Accordingly, with the use of the power shift transmission as described above, it is desirable to provide a means for cold weather disconnection of the power train between the engine and the power shift transmission. It is also desirable to provide a means for shifting the range transmission from one speed to another and this is, as a rule done with all components of the transmission being stationary. In other words, if the gears are rotating in the transmission there is danger of stripping the gears or damaging the gears in some manner when the gears are shifted. Accordingly, this invention provides a means whereby these changes in the speed range can be accomplished and also a means for providing "inching" which is a means of slowly slipping the clutch to control a creeping movement of the vehicle. Also the means providing disconnect for cold weather between the engine and the power shift transmission can also be operated with this mechanism.

It is an object of this invention to provide a single lever brake and clutch control for vehicle transmission.

It is another object of this invention to provide a brake and clutch control for vehicle transmission and means for selectively operating the engagement or disengagement of a second clutch by operation of a hand lever and simultaneous operation of a foot pedal.

It is a further object of this invention to provide a vehicle brake and clutch control with a hand lever to selectively disengage a second clutch while operating a single foot pedal to avoid accidental disengagement of the second clutch.

It is a further object of this invention to provide a brake and clutch control with creeping control on the clutch pedal and a hand control to selectively disengage a second clutch while operating said clutch lever control.

It is a further object of this invention to provide a latch to hold the second clutch in the disengaged position and to require two deliberate actions to re-engage the clutch to prevent accidental clutch engagement.

Objects of this invention are accomplished providing a pivotally operated foot pedal which normally operates for disengagement of the clutch and engagement of the brake upon further depression of the pedal. A hand control having a latch, selectively latches for disengagement when used simultaneously with the foot pedal, a second clutch which is also operated simultaneously with disengagement of said first clutch. The latching mechanism will automatically retain the second clutch in a disengaged position if so desired. The second clutch provides a cold weather disconnection between the engine and the power train to permit easier turnover in the engine particularly under cold weather conditions.

The preferred embodiments of this invention will be illustrated in the attached drawings.

FIG. 1 illustrates the side elevation view of the pedal and control for operating the clutch and brake.

FIG. 5 is a fragmentary view showing a portion of the foot pedal engaging a pin for actuating the second clutch taken on line V—V of FIG. 4.

FIG. 6 illustrates the latch arrangement and its connection with the linkage for actuating the second clutch to provide cold weather disconnecting of the engine taken on line VI—VI of FIG. 4.

FIG. 7 illustrates a fragmentary view of the mounting bracket and a pin for controlling the disengagement of the second clutch or disengaging the engine from the power train taken on line VII—VII of FIG. 4.

FIG. 8 is a schematic illustration of the hydraulic control valve operated by the linkage to operate the transmission clutch and brake.

FIG. 9 is a schematic illustration of the power train of the vehicle.

Figure 3:
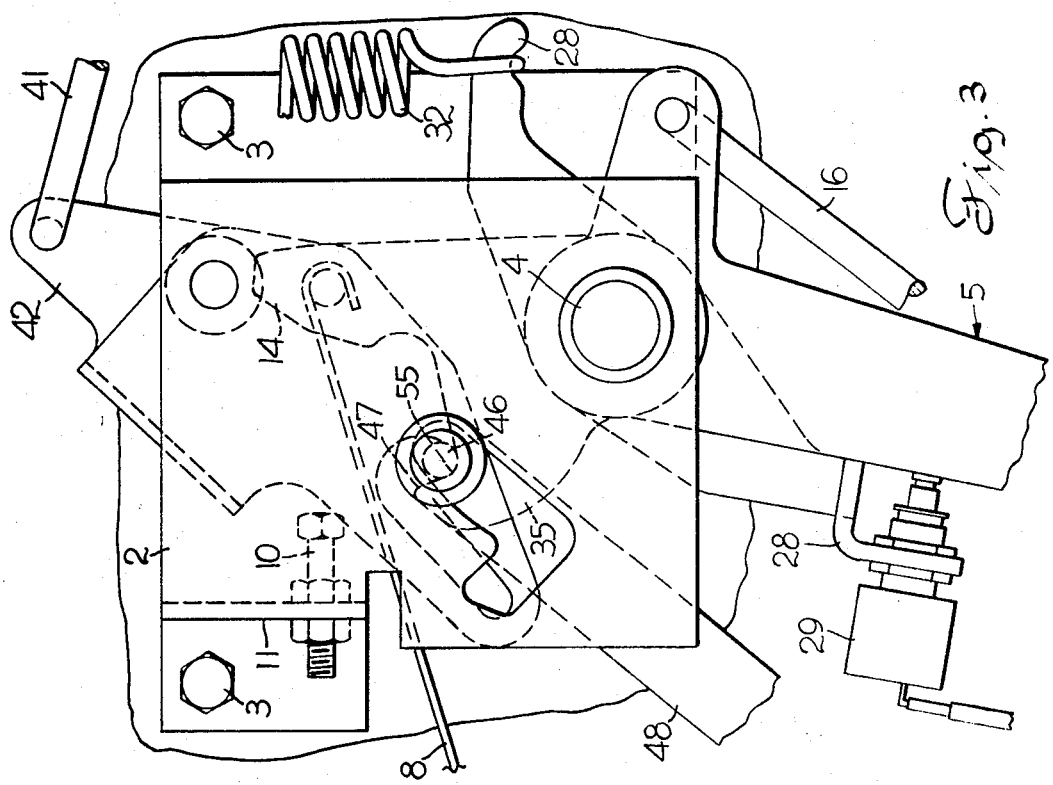
FIG. 3 illustrates the latch control positioned with the foot pedal operating two clutches simultaneously.

Referring to FIG. 1 the mounting bracket 2 is fastened on the chassis 1 by means of the plurality of bolts 3. The mounting bracket carries a pin 4 which pivotally supports the foot pedal 5. The foot pedal 5 forms a foot pad 6 for operating foot pedal 5 and carries a return pin 7 connected to the return spring 8, which in turn is connected to a tab 9 on the chassis 1. The adjusting screw 10 threadedly engages a flange 11 and is locked in position by the nuts 12 and 13. When the pedal 5 is returned to its retracted position it comes to rest as the abutment 14 engages the end of the adjusting screw 10.

The foot pedal 5 is formed with an arm 15 having a perforation receiving the rod 16. The rod 16 extends downwardly and is pivotally connected to the bell crank 17 by the pin 18. The bell crank 17 is pivotally supported by the pin 19 on the bracket 20 supported on the chassis. The opposite end of the bell crank 17 carries the link 21 which extends to engage the lever 22 pivotally supported on the flange 23, on the valve housing 24. The power shift control lever 25 is pivotally supported on the extension 26 which operates the spool 27, in the valve housing 24. The lever 25 provides a manual shift for the power shift transmission to selectively engage the desired speed ratio of the power shift transmission.

The brake and clutch pedal 5 is pivotally mounted on the pin 4 which also pivotally supports a switch lever 28. The switch lever 28 carries the neutral safety switch 29 which is normally open but is closed by actuation of the button 30 by the pedal 5.

The switch lever 28 is biased to the return position against the rest 31 by the return spring 32 which is connected between the chassis and one arm of the switch lever.

The pedal 5 travels through an angular displacement when it is operated in which the first portion is considered inching as illustrated in FIG. 1. During the inching phase of angular rotation of the pedal 5 the hydraulic valve is throttling pressurized fluid and the pressure in the clutch actuator is gradually decreased. The gradual decrease of the pressure in the clutch actuator permits the slipping of the clutch to move the vehicle very slowly. This adapts itself well when connecting an implement to a tractor because a sensitive control of the movement of the vehicle is required. As the pedal swings farther there is a dwell phase during which the clutch is completely disengaged prior to engagement of the brake. Beyond this point the neutral safety switch is operated to close the starter circuit to permit starting of the vehicle engine. When the neutral safety switch is closed the switch arm rotates on its axis against the biasing force of a return spring 32. Spring 32 substantially increases the force required to further depress the pedal 5. This provides a brake feel for the operator which indicates to the operator the neutral safety switch has been closed and that the brake is being actuated.

The pedal 5 also forms a latch arm 35 which is adapted for operating the engine clutch 36. The engine clutch 36 provides a means of disconnecting the power from the transmission. This is particularly advantageous when the ambient temperatures are low and the transmission fluids create considerable drag on the transmission. During starting of the engine, this drag can be objectionable.

Accordingly, the means for disconnecting the engine drive is provided. This consists essentially of a push button 37 mounted on the dashboard 38. The push button slides within the sleeve 39 mounted on the dashboard 38 and is biased to a return position by the spring 40. The link 41 connects to the latching arm 42. The latching 42 is pivotally supported on the bracket 2 by means of the pin 43. The latching lever 42 forms slot 44. Similarly an L-shaped slot 45 is formed in the bracket 2. These two slots partially overlap as shown in FIG. 1. The degree of overlapping may be modified by movement of the latching lever 42. Moving the latching lever 42 by the push button 37 moves the pin 46 into the seat 47 of the latch arm 35 of pedal 5. When the pedal is operated, the pin 46 rotates with the latch arm 35 to disengage the clutch 36.

The clevis 48 which receives the pin 46 on one end is connected through the rod 49 to the bell crank 50. Bell crank 50 is pivoted on the pin 51 supported on the chassis. As the bell crank 50 is rotated about the pin 51 in the clockwise direction the clutch 36 is disengaged and conversely the reverse rotation of the bell crank will engage the clutch 36. To more clearly illustrate the component shown in the pedal mechanism and the latching mechanism, FIGS. 5, 6 and 7 show section views of the various components. FIG. 5 illustrates the portion of the pedal 5 with the return spring 8 connected through the pin 7. The latching arm 35 is shown with the pin 46 positioned in its seat 47 of the latch arm 35 for rotation with the foot pedal 5 when operating the clutch 36.

FIG. 6 shows latching lever 42 with the pin 46 in the extreme end of the slot 44. Generally this position is also shown in FIG. 1.

FIG. 7 illustrates the pin 4 which supports the pedal 5 on the bracket 2. The slot 45 is shown with the pin 46 displaced for engagement with the latch arm 35 of the pedal 5. The pedal 5 is shown in FIG. 5 with the positioning of the pin for engagement with latch arm 35.

Figure 2:
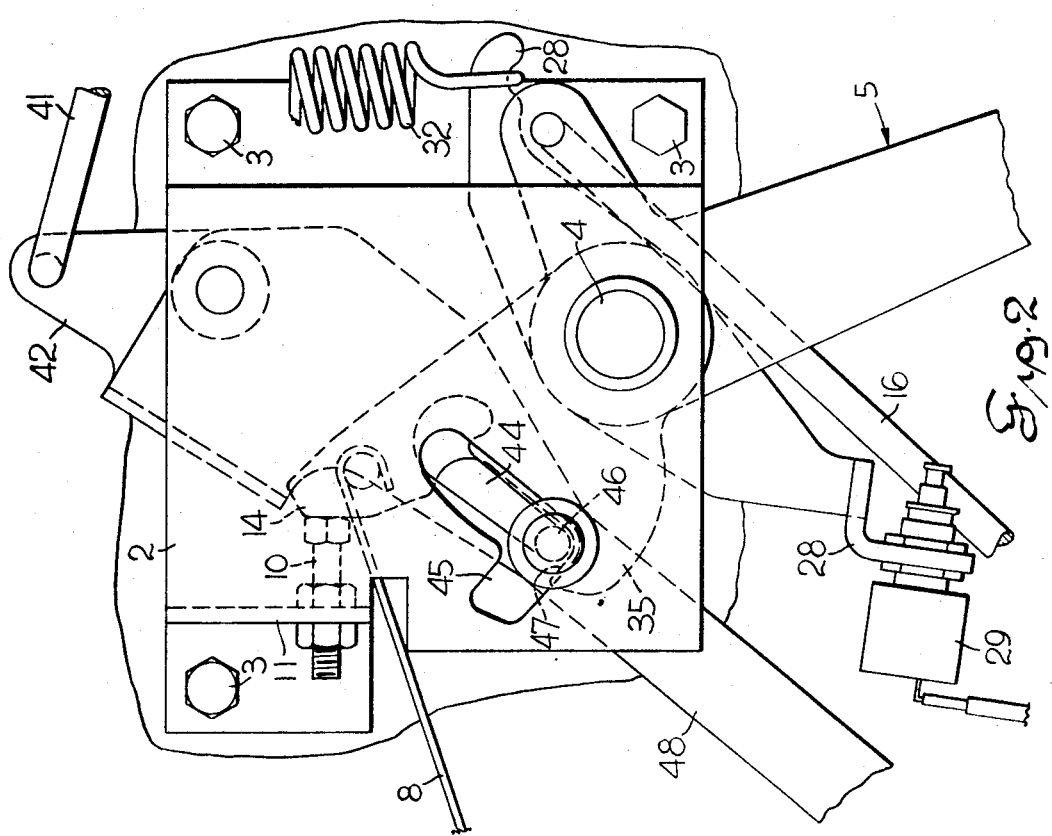
FIG. 2 is a fragmentary side elevation view showing the control lever with the latch control in position for the disengagement of two clutches.
Figure 4:
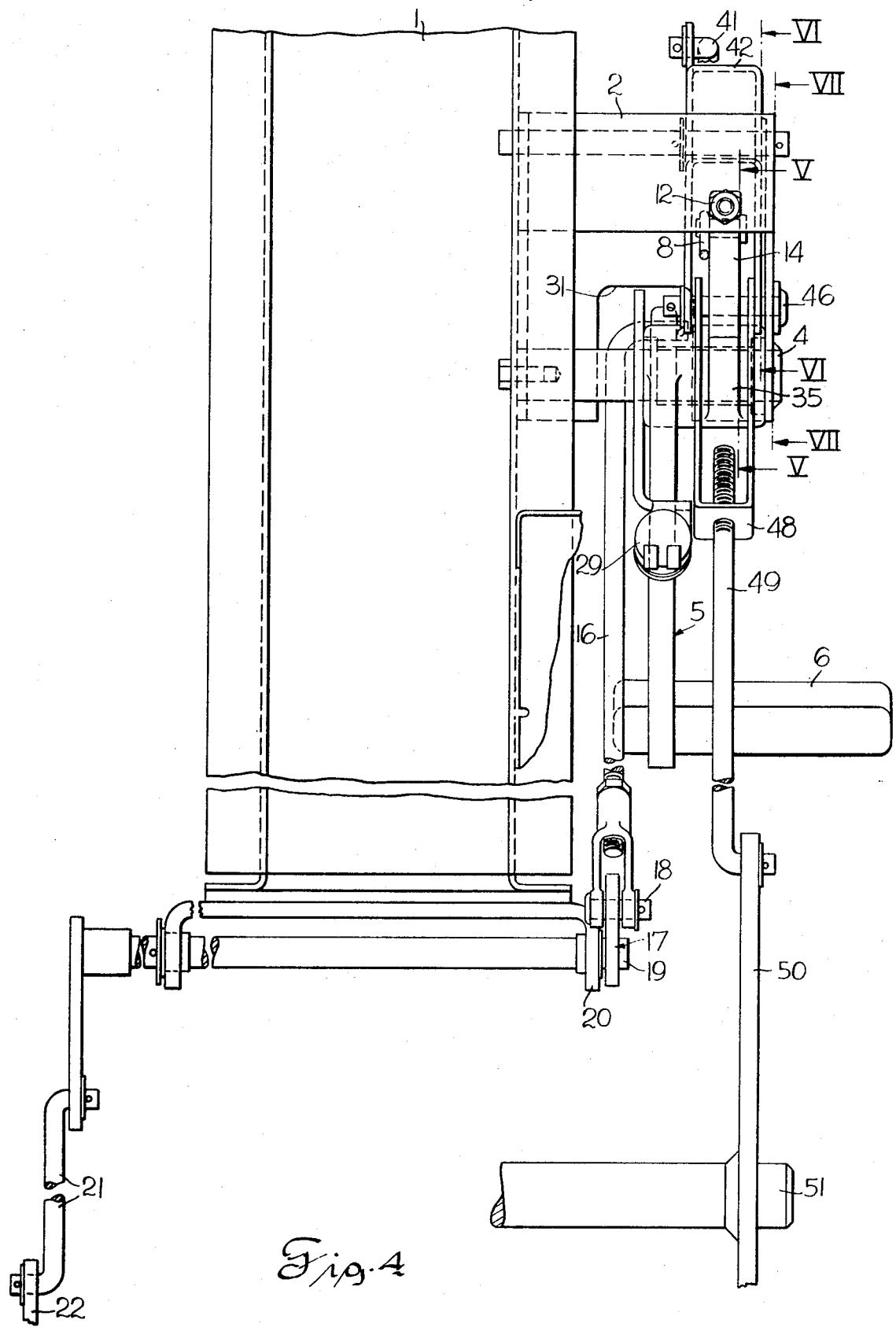
FIG. 4 illustrates an end view generally of the mechanism shown in FIG. 1.

FIG. 2 illustrates a fragmentary view of the mechanism shown in FIG. 1 with the latching lever 42 which is operated by the push button 37 to a position seating the latch pin 46 on the latch arm 35 on the pedal 5. In this position the slot 44 overlaps slot 45 and the pin 46 is permitted to rotate with the latch arm 35 as the pedal 5 is depressed. By holding the latching lever 42 in this position when the pedal 5 is depressed the pin rotates on the center of the pin 4 to a position as shown in FIG. 3. If the pedal is rotated to its extreme position as shown in FIG. 3, the pin 46 will become seated in the notch 55 of slot 44. If the pedal 5 is released at this point the pin 46 will be retained in the notch 55 and the clutch 36 will remain disengaged. In this position the engine can be started.

To release the pin 46 and disengage the clutch 36, the pedal must again be depressed and the latching lever 42 rotated counterclockwise to release the pin 46. The springs in clutch 36 return pin 46 and release the clutch 36 when the pedal is released.

For a purpose of illustration, the power train is illustrated in FIG. 9. The engine 60 drives through the clutch 36 which provides a means of disconnecting the power from the power shift transmissions 75 when desired. This clutch is also shown as clutch 36 in FIG. 1. The power shift transmission 75 drives through the range shift transmission 61 which in turn drives through the final drive 63 to drive the rear wheels of vehicle. The range shift transmission consists essentially of a multiple speed transmission which should normally be shifted only when the transmission components are stationary. Accordingly, the transmission brake which is operated by the pedal 5 as shown in FIG. 1 brakes the power shift transmission 75. This stops rotation of the components in the range transmission and the transmission can be shifted manually from one speed to another speed.

FIG. 8 also illustrates a multiple speed power shift transmission 75 schematically with brake and clutch actuating controls 65 and 73 which selectively actuates one or more clutches or brakes in the transmission to provide the desired speed ratio through the power shift transmission. It is understood that normally the brake and clutch actuating controls 65 and 73 will operate the power shift transmission 75 in shifting from one gear ratio to another.

Preferably a lower speed range would be selected on the power shift transmission when operating the inching control of brake pedal 5. Section 67 shows the valve 70 position for normal operation of the clutches of the power shift transmission. The brake is vented to sump 71 while the pump 72 supplies pressurized fluid to actuate the multiple speed power shift transmission 75.

Initially the inching would be provided by section 66 of the valve 70. Section 66 would vent the brake actuating control for the transmission to sump 71.

The dwell position of section 68 is shown in which the clutch is disengaged and also the brake is disengaged.

Clutches for operating the multiple speed power shift transmission 75 are disengaged and fluid is throttled to begin actuation of the transmission brake actuating control 73 as shown by section 69. With the brake actuated the section 74 is positioned to transmit fluid from the clutches to sump and pressurized fluid from pump 72 is transmitted to the transmission brake 73 which is fully engaged. In this position the components of the power shift transmission 75 are braked and this provides a condition whereby the range transmission 61 can be shifted from one speed to another.

The operation of the transmission will be described in the following paragraphs.

FIG. 9 generally illustrates the power train for the vehicle. The engine 60 drives through a manually operated clutch 36 to the power shift transmission 75. The manually operated clutch 36 is always in engagement when the vehicle is in operation. The power shift transmission 75 has means for shifting the transmission from one gear range to the other as desired for operation of the vehicle. The power shift transmission 75 drives through a range transmission 61 which consists of, for the purpose of illustration, a two-speed transmission which is shiftd when the vehicle and transmission are stationary. In this position the range transmission can be shifted from one gear range to another which will provide a simple multiple of the gear ratios of the power shift transmission 75 when transmitted to the final drive 63.

Under cold weather conditions the viscosity of the oil and the internal friction of the engine require that the power shift transmission be disconnected from the engine in order to permit the engine to rotate more freely. This device is shown for disconnecting clutch 36 as shown in FIG. 1.

When the vehicle is in operation the control lever 25 provides a means for shifting the selected clutches of the power shift transmission to engage the desired gear ratios in the transmission. The shifting of the power shift transmission through the control lever 25 is accomplished while the vehicle is in operation and the gear ratios may be increased or decreased as desired.

The clutch 36, however, is a manual clutch and is connected between the engine and the multiple speed power shift transmission 75. The clutch 36 can be disengaged through the foot pedal 5 when desired. Also the control of the foot pedal 5 provides an inching of any clutch in the power shift transmission through clutch actuating control 65. The particular clutch engaged in the power shift transmission by clutch actuating control 65 is dependent on the position of the lever 25. The inching control is used primarily when it is desired to move the vehicle slowly for connection to an implement or for slipping the clutch to provide a slow gradual movement. As the brake pedal 5 is depressed, the initial section 67 provides operation of the multiple speed power shift transmission. As the lever 22 is operated in response to the pivotal movement of the pedal 5, the inching section 66 of the control valve 70 is moved into operation between the pump 72 and the clutch actuating control 65. This provides throttling through the inching section limiting the flow of pressurized fluid to the clutch actuating control 65 which in turn operates hydraulic actuators in the multiple speed power shift transmission 75. The farther the pedal 5 is depressed, the greater the pressure is reduced in the clutch actuating control 65. With a continual depression of the pedal 5 the dwell section 68 is then placed in operation between the pump 72 and the clutch actuating control 65. In this position the clutch in the multiple speed power shift transmission 75 is disengaged. Due to inertia, the components in the power shift transmission continue to rotate and accordingly the pedal 5 is depressed until the section 74 of valve 70 is in operation. When the section 74 is positioned intermediate to pump 72 and the transmission brake activating control 73, the transmission brake stops rotation of the rotating components in the multiple speed power shift transmission. Accordingly, the power train between the engine and the final drive assembly is disconnected and the range shift 61 may be shifted.

Simultaneously with the disengagement of a clutch in the multiple speed power shift transmission 75 it may be desirable to disengage clutch 36. To disconnect clutch 36, prior to the depression to the pedal 5, the push button 37 is moved forwardly. This operates the latching lever 42 to the position shown in FIG. 2 wherein the slots 44 and 45 overlap and thereby positioning the pin 46 in the seat 47 of the latch arm 35 of pedal 5. With the pin in this position when the pedal 5 is depressed, the pin will be carried by the sea 47 as the lever is pivoted. A continual depression of the pedal 5 will rotate the pin 46 to the position as shown in FIG. 3. In this position when the pedal 5 is released, the pin 46 remains seated in the notch 55. With the pin in notch 55 the clutch 36 remains disengaged.

It is noted that when the pin 46 is carried on the latch arm 35, that the bell crank 50 rotates about its axis defined by pin 51 thereby disengaging clutch 36. The clutch 36 may be retained in this disengaged position as the vehicle is started. It is assumed that the vehicle is started through an electrical starting circuit.

When the pedal 5 is depressed it swings through the inching and dwell phase of angular displacement as shown in FIG. 1. When the pedal 5 engages the neutral safety switch 29, the neutral safety switch is then closed permitting the electrical starting circuit to operate since the clutch is disengaged and there is no danger of the vehicle lurching forward when the vehicle engine is started. A further depression of the pedal 5 pivots the switch lever 28. The pivoting of the switch lever 28 tensions the return spring 32 which produces a substantial force on the pedal indicating to the operator that the pedal 5 is swinging into the braking phase of its operation. The neutral safety switch 29 being positioned on the lever 28 permits the continued movement of the lever 5 to operate the brake and yet maintain the neutral safety switch in closed position. The neutral safety switch 29 on switch lever 28 will return in response to the biasing force of the spring 32 when the brake pedal 5 is released the return spring 8 connected to the brake pedal 5 will return the brake pedal to its normally retracting position causing the abutment on the arm 14 to engage the head of the adjusting screw 10.

The spring 32 serves the dual purpose of returning the switch lever 28 to retractive position when the pedal 5 is retracted and also providing a brake "feel." In other words, the operator of the vehicle can sense the braking phase of pedal rotation during operation of the pedal 5. This indicates that the neutral safety switch 29 is closed and that the brake pedal is engaging the transmission brake so that he may then shift the range transmission 61 without damage to the gears. By mounting the neutral safety switch on the switch lever 28, the pedal 5 does not come to an abrupt stop when the switch is engaged but is permitted to rotate with the lever for the desired amount of rotation to set the brakes.

It is also noted that when operating pedal 5 and the brake that the engine clutch 36 is also disengaged and can be positioned to be retained in the disengaged position through the latch engaging lever 42 and as previously described.

The embodiments of the invention in which an exclusive property or privilege is claimed are defined as follows:

1. A vehicle clutch actuating means comprising, a mounting bracket adapted for mounting on a vehicle, a pedal pivotally mounted on said bracket, a first clutch, a clutch actuating mechanism connected between said pedal and said clutch for selectively engaging and disengaging said first clutch, a second clutch, a second clutch actuating means for selectively engaging and disengaging said second clutch including, a latch on said pedal, a latch engaging mechanism including, a latch engaging control lever pivoted on said bracket for selectively latching said second clutch actuating means on said pedal to operate said second clutch when said pedal is pivoted.

2. A vehicle clutch actuating means as set forth in claim 1 wherein said clutch pedal defines a foot pedal for operating said clutches.

3. A vehicle clutch actuating means as set forth in claim 1 wherein said pedal comprises a foot pedal, said latch engaging mechanism includes a hand lever, a latch engaging lever connected to said hand lever to selectively engage said second clutch actuating means with said pedal to thereby operate said second clutch when said pedal is pivoted.

4. A vehicle clutch actuating means as set forth in claim 1 wherein said first clutch defines a hydraulic clutch for use in a power shift transmission, said second clutch defines a manually operated clutch adapted for disconnecting the engine from the power train of said vehicle, said pedal thereby disengaging a hydraulic clutch in said power shift transmission and disengaging the engine from said transmission to facilitate starting of the vehicle.

5. A vehicle clutch actuating means as set forth in claim 1 wherein said latch engaging mechanism for selectively latching said second clutch actuating means includes a push button, said latch engaging lever connected to said push button in said second clutch actuating means for connecting said pedal to said second clutch actuating means for operating said second clutch when said pedal is pivoted.

6. A vehicle clutch actuating means as set forth in claim 1 wherein said second clutch actuating means includes a pin, a latch arm on said pedal, said latch engaging mechanism thereby positioning said pin on said latch arm of said pedal to disengage said second clutch when said pedal is pivoted.

7. A vehicle clutch actuating means as set forth in claim 1 wherein said latch engaging mechanism includes a latch engaging lever pivotally mounted on said bracket, said lever including means connected to said second clutch engaging means, said latch engaging lever pivotally connecting said second clutch engaging means with said latch of said pedal to thereby disengage said second clutch when said pedal is depressed.

8. A vehicle clutch actuating means as set forth in claim 1, wherein said breacket defines a first slot, said latch engaging mechanism including a latch lever defining a second slot adapted for alignment with said first slot in said bracket, said second clutch engaging mechanism including a pin received in said slots, said pedal defining a latch arm, said latch engaging means thereby aligning said slots for positioning said pin on said latch arm of said pedal for disengaging said second clutch when said pedal is pivoted.

9. A vehicle clutch actuating means as set forth in claim 1 wherein said pedal defines a latch arm, said second clutch actuating mechanism includes a clevis receiving a pin, said latch engaging mechanism thereby positioning said pin on said latch arm to thereby disengage said second clutch of said pedal as depressed.

10. A vehicle clutch actuating means as set forth in claim 1 wherein said latch engaging mechanism includes a lever and a spring biasing said lever to a return position to prevent connection between said second clutch actuating means and said pedal, a pedal return spring for returning said clutch to a retracted position, said latch engaging mechanism including a push button, means connecting said push button to said lever for selectively connecting said second clutch engaging mechanism with said latch of said pedal to thereby disengage said second clutch while said clutch pedal is pivoted.

* * * * *